United States Patent
Wisniewski

(10) Patent No.: US 6,669,505 B2
(45) Date of Patent: Dec. 30, 2003

(54) VEHICLE ELECTRONIC CONTROL UNITS

(75) Inventor: Andrew Wisniewski, South Lyon, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/206,573

(22) Filed: Jul. 26, 2002

(65) Prior Publication Data

US 2003/0049947 A1 Mar. 13, 2003

Related U.S. Application Data

(60) Provisional application No. 60/318,920, filed on Sep. 13, 2001.

(51) Int. Cl.$^7$ ............................................. H01R 13/52
(52) U.S. Cl. ..................................................... 439/521
(58) Field of Search ............................... 439/521, 76.1, 439/76.2, 367; 361/752, 796; 174/59

(56) References Cited

U.S. PATENT DOCUMENTS

| | | | | |
|---|---|---|---|---|
| 4,047,242 A | * | 9/1977 | Jakob et al. ................. | 361/714 |
| 4,409,641 A | * | 10/1983 | Jakob et al. ................. | 361/720 |
| 5,671,122 A | * | 9/1997 | Schoettl et al. ............. | 361/715 |
| 5,777,850 A | * | 7/1998 | Jakob et al. ................. | 361/736 |
| 6,108,202 A | * | 8/2000 | Sumida ....................... | 361/690 |
| 6,155,856 A | | 12/2000 | Sanada | |
| 6,213,096 B1 | | 4/2001 | Kato et al. | |
| 6,302,190 B1 | | 10/2001 | Clamp et al. | |
| 6,302,707 B1 | * | 11/2001 | Kolar et al. ................. | 439/76.1 |
| 6,315,604 B1 | * | 11/2001 | Lee ............................ | 439/535 |
| 6,318,329 B1 | | 11/2001 | Sato | |
| 6,434,013 B2 | * | 8/2002 | Kitamura et al. ........... | 361/752 |
| 6,478,614 B1 | * | 11/2002 | De'Longhi .................. | 439/519 |
| 6,552,911 B1 | * | 4/2003 | Haupt et al. | |
| 6,560,115 B1 | * | 5/2003 | Wakabayashi et al. ...... | 361/728 |

FOREIGN PATENT DOCUMENTS

| | | |
|---|---|---|
| EP | 0999098 A | 5/2000 |
| FR | 2715247 A | 7/1995 |
| WO | 9429145 A | 12/1994 |

* cited by examiner

Primary Examiner—Ross Gushi

(57) ABSTRACT

The electronic control unit assembly (10) includes an electronic control unit (16) and a housing (18). The housing (18) include a housing first portion (28) and a housing second portion (30). The housing first portion (28) mounts to a relatively planar surface of the ECU (16). The housing second portion (30) extends from the housing first portion in a cantilever manner to at least partially cover the connector interface (22) and the plurality of connectors (24) to provide protection therefore.

11 Claims, 2 Drawing Sheets

VEHICLE ELECTRONIC CONTROL UNITS

The present application claims priority to U.S. Provisional Patent Application Ser. No. 60/318,920, filed Sep. 13, 2001.

BACKGROUND OF THE INVENTION

The present invention relates to an electronic control unit, and more particularly to a housing for an electronic control unit to protect connectors which extend therefrom.

A vehicle electronic control unit (ECU) operates to control a vehicle system such as airbag and restraints. In some instances, the ECU must be mounted in an exposed position within the vehicle passenger compartment such as under the vehicle seat. A plurality of connectors typically extend from the ECU. The connectors connect the ECU to the vehicle system which are controlled by the ECU. The exposed position may subject the ECU to damage from external forces which may disconnect or damage the exposed connectors.

Although the connectors must be protected, the connectors must also be accessible for maintenance. Specified "finger clearances" must be provided to allow ready access to the connectors. These competing priorities of protection and accessibility create mounting difficulties for the ECU. Moreover, as not all mounting locations require the same level of protection, it is desirable to avoid directly incorporating relatively expensive protection to the base ECU design.

Accordingly, it is desirable to provide an inexpensive ECU housing which protects the exposed connectors while allowing access to the connectors for maintenance. It is further desirable to removably mount the housing such that protection can be provided for only those ECU mounting positions which expose the ECU.

SUMMARY OF THE INVENTION

The electronic control unit assembly according to the present invention includes an electronic control unit (ECU) and a housing. The ECU is a box-like structure which contains the electronic controls such as a microprocessor and memory. The ECU includes a connector interface which extends from the ECU. The connector interface removably receives a plurality of connectors which extend from a wire harness to provide communication between the ECU and a vehicle system.

The housing includes a housing first portion and a housing second portion. The housing first portion mounts to a relatively planar surface of the ECU. A plurality of fasteners pass through apertures within the housing first portion and are threaded into the ECU to fix the housing to the ECU. The housing second portion extends from the housing first portion in a cantilever manner to at least partially cover the connector interface and the plurality of connectors to provide protection therefore.

The present invention therefore provides an inexpensive ECU housing which protects the exposed connectors yet allows access to the connectors for maintenance. It also gives the option of not using the protection at all. The main ECU has the external fastener holes pre-cast. Then the "bracket" can be used in only certain packaging locations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
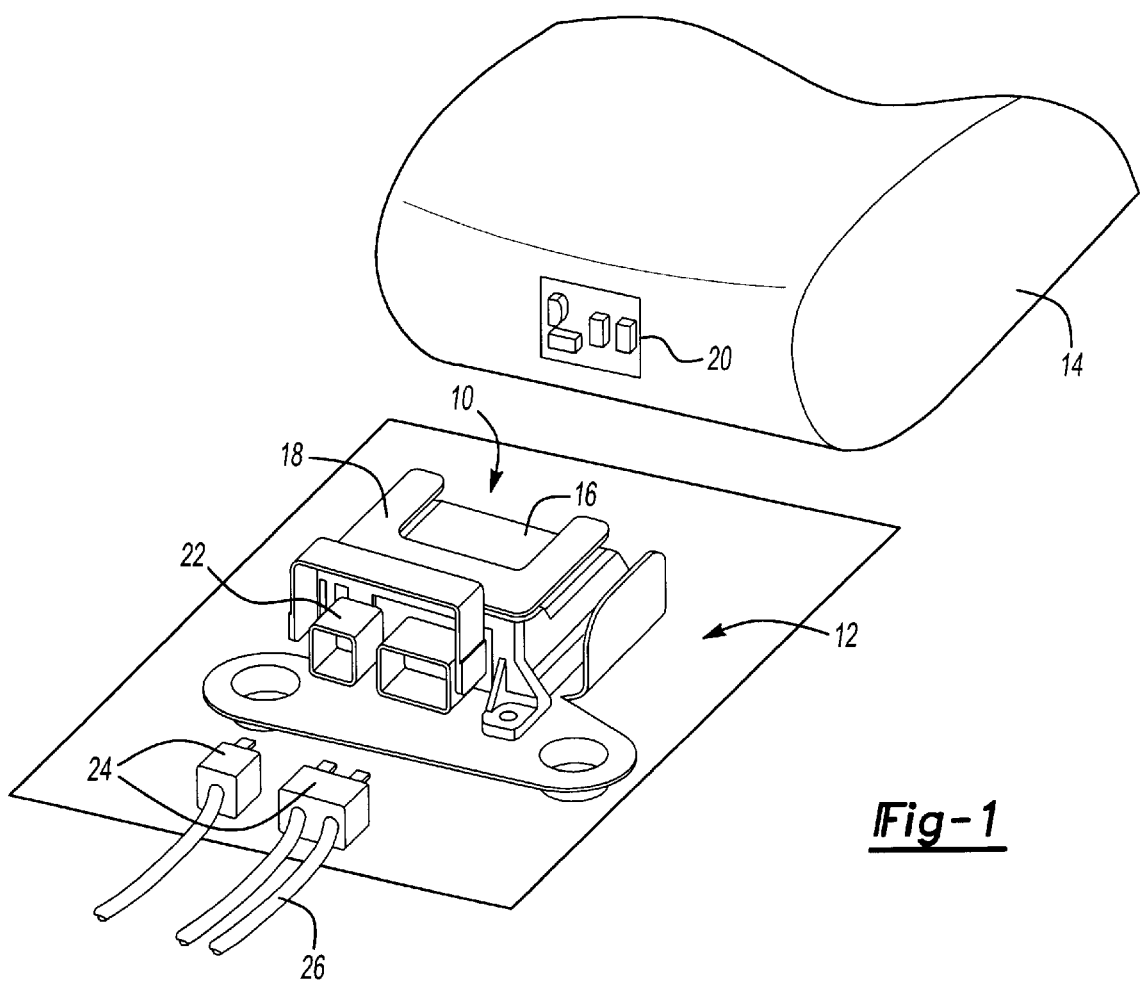
FIG. 1 is a general perspective view an electronic control unit mounted in a vehicle passenger compartment.

FIG. 1 illustrates a general perspective view of an electronic control unit assembly 10. The electronic control unit assembly 10 is typically mounted within a vehicle passenger compartment 12 under an electrically or manually adjustable vehicle seat 14. It should be understood that other mounting locations will benefit from the present invention.

The electronic control unit assembly 10 includes an electronic control unit (ECU) 16 and a housing 18. It should be understood that the term "housing" is to be construed broadly and shall not be limited to a box-like enclosure.

The ECU 16 is a box-like structure which contains the electronic controls such as a microprocessor and memory. The ECU 16 communicates with controls (illustrated schematically at 20) or the like to operate air bags and similar restraint devices. It should be understood that vehicle systems other than a seat will benefit from the present invention. The ECU 16 includes a connector interface 22 which extends from one side of the ECU 16. The connector interface 22 is preferably oriented toward a driver side of the vehicle, however, other orientations will also benefit from the present invention. The connector interface 22 removably receives a plurality of connectors 24 which extends from a wire harness 26 to provide communication between the ECU 16 and the vehicle system 14. The connectors 24 are typically manufactured of a plastic material or the like and may be more susceptible to damage than the ECU 16.

Figure 2:
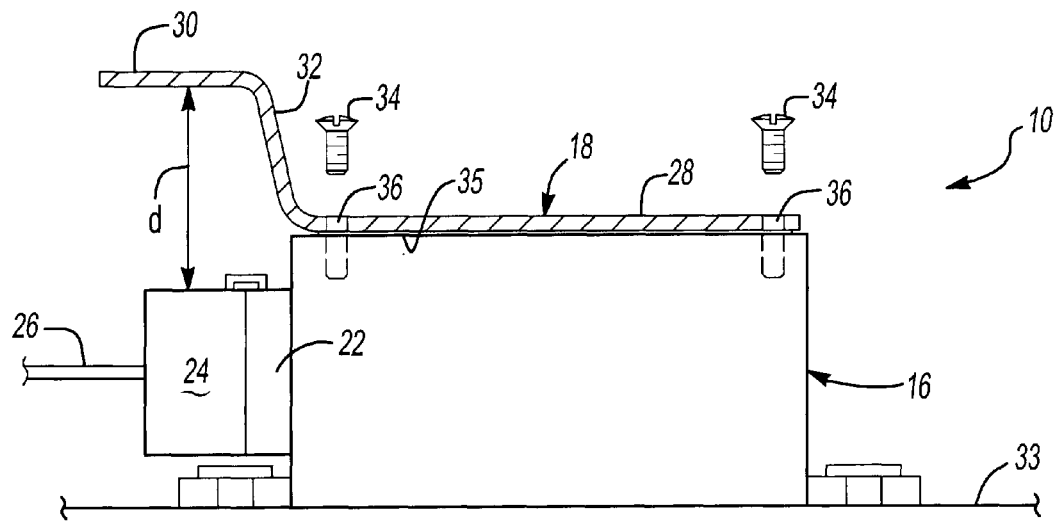
FIG. 2 is a side view of the block diagram of the electronic control unit.

Referring to FIG. 2, the housing 18 is preferably a plate-like member manufactured from a metallic material such as steel. The housing 18 include a housing first portion 28 and a housing second portion 30. An intermediate portion 32 bridges the housing first portion 28 and the housing second portion 30.

The housing first portion 28 mounts to a relatively planar surface 35 of the ECU 16. The planar surface 35 is preferably an upper surface of the ECU 16 located opposite a vehicle passenger compartment floor 33. A plurality of fasteners 34 pass through apertures 36 (also illustrated in FIG. 3) within the housing first portion 28 and are threaded into the ECU 16 to fix the housing 18 to the ECU 16.

The housing second portion 30 extends from the housing first portion 28 and at least partially covers the connector interface 22 and the plurality of connectors 24. That is, the housing second portion 30 extends from the housing first portion 28 in a substantially cantilevered manner to protect the connector interface 22 and the plurality of connectors 24 from damage.

The housing second portion 30 is displaced further away from the ECU 16 relative the housing first portion 28. Preferably, the housing second portion 30 extends a predetermined distance d away from the connectors 24. The predetermined distance d is defined by the distance necessary for an operator to release the plurality of connectors 24 from the connector interface 22. It should be understood that as different connectors 24 require different disassembly techniques, the predetermined distance d will primarily be determined by the disassembly technique. This predetermined distance is commonly referred to as a "finger clearance" which is necessary for an operator to reach each connector 24 and release it from the connector interface 22. Although well protected, the connectors 24 are readily accessible.

Figure 3:
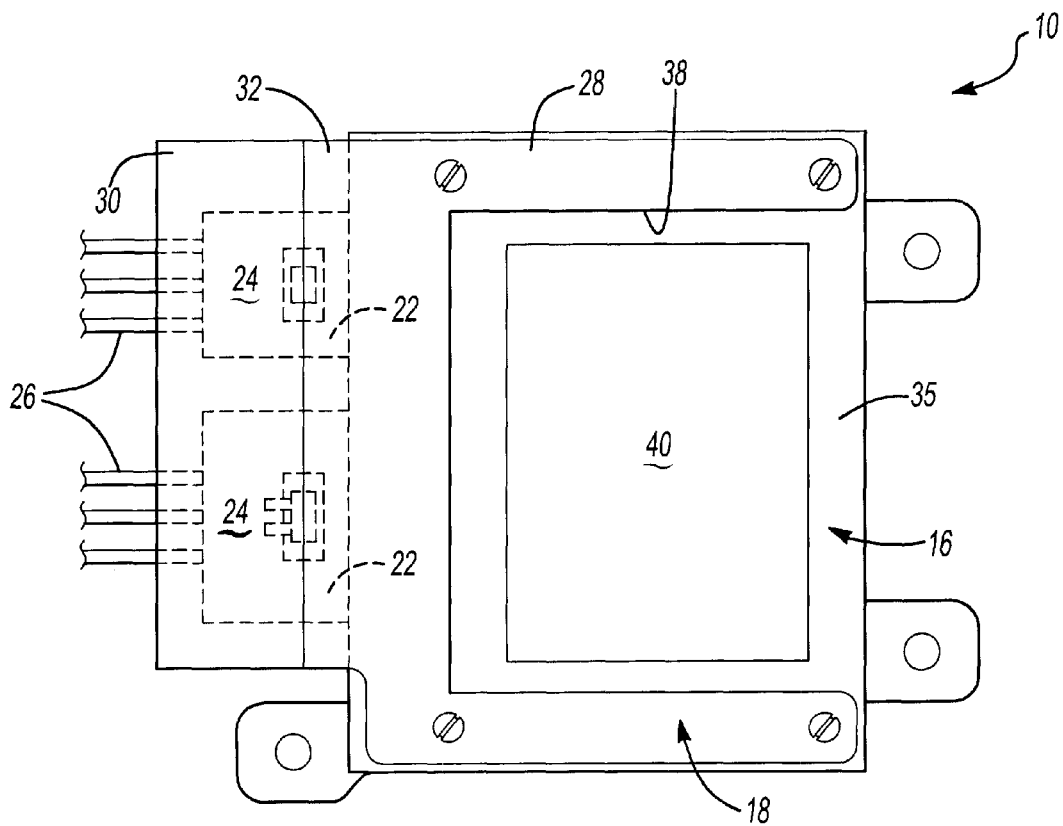
FIG. 3 is a top view of the block diagram of the electronic control unit.

Referring to FIG. 3, the housing 18 housing first portion 28 includes an opening 38. Opening 38 is preferably arranged to allow an ECU identification label 40 to be visible. The housing 18 will therefore not obscure the label 40 but will still meet strength and resonance requirements for protection of the connectors 24.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An electronic control unit assembly comprising:
   an electronic control unit;
   a connector interface extending from said electronic control unit; and
   a housing comprising a housing first portion and a housing second portion, said housing first portion mountable to said electronic control unit, and said housing second portion displaced from said housing first portion to at least partially cover said connector interface.

2. The electronic control unit assembly as recited in claim 1, wherein said housing first portion comprises an opening such that at least a portion of said electronic control unit is visible therethrough.

3. The electronic control unit assembly as recited in claim 1, wherein said housing second portion is offset and substantially parallel to said housing first portion.

4. The electronic control unit assembly as recited in claim 1, wherein said housing second portion is displaced further away from said electronic control unit than said housing first portion.

5. The electronic control unit assembly as recited in claim 1, wherein said housing first portion comprises a plurality of apertures to receive fasteners which engage said electronic control unit.

6. The electronic control unit assembly as recited in claim 1, wherein said housing comprises a plate.

7. An electronic control unit assembly comprising:
   an electronic control unit defining a relatively planar surface;
   a connector interface extending from said electronic control unit; and
   a housing comprising a housing first portion and a housing second portion, said housing first portion mountable to said planar surface, and said housing second portion at least partially covering said connector interface, said housing second portion offset and substantially parallel to said housing first portion.

8. The electronic control unit assembly as recited in claim 7, wherein said housing first portion comprises an opening such that at least a portion of said relatively planar surface is visible therethrough.

9. The electronic control unit assembly as recited in claim 7, wherein said housing comprises a plate.

10. The electronic control unit assembly as recited in claim 9, wherein said housing second portion is displaced further away from said relatively planar surface than said housing first portion.

11. The electronic control unit assembly as recited in claim 9, wherein said housing second portion is offset from said housing first portion defines a predetermined clearance between said connector interface and said housing second portion.

* * * * *